(12) United States Patent
Lee et al.

(10) Patent No.: US 11,735,714 B2
(45) Date of Patent: Aug. 22, 2023

(54) NEGATIVE ELECTRODE SLURRY COMPOSITION FOR LITHIUM SECONDARY BATTERY, AND METHOD FOR PREPARING THE SAME

(71) Applicant: LG CHEM, LTD., Seoul (KR)

(72) Inventors: Jong Won Lee, Daejeon (KR); Houng Sik Yoo, Daejeon (KR); Hyeon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 247 days.

(21) Appl. No.: 16/761,639

(22) PCT Filed: Nov. 6, 2018

(86) PCT No.: PCT/KR2018/013414
§ 371 (c)(1),
(2) Date: May 5, 2020

(87) PCT Pub. No.: WO2019/088809
PCT Pub. Date: May 9, 2019

(65) Prior Publication Data
US 2020/0259162 A1  Aug. 13, 2020

(30) Foreign Application Priority Data
Nov. 6, 2017 (KR) .................... 10-2017-0146895

(51) Int. Cl.
*H01M 4/66* (2006.01)
*H01M 4/139* (2010.01)
(Continued)

(52) U.S. Cl.
CPC .......... *H01M 4/133* (2013.01); *H01M 4/139* (2013.01); *H01M 4/625* (2013.01); *H01M 4/664* (2013.01);
(Continued)

(58) Field of Classification Search
None
See application file for complete search history.

(56) References Cited

U.S. PATENT DOCUMENTS 7,005,213 B2   2/2006   Ndzebet et al.
2002/0177043 A1  11/2002   Ndzebet et al.
(Continued)

FOREIGN PATENT DOCUMENTS

CN   101202345 A   6/2008
CN   102867960 A   1/2013
(Continued)

OTHER PUBLICATIONS https://www.sciencedirect.com/topics/earth-and-planetary-sciences/saponite (2017).*
(Continued)

*Primary Examiner* — Tracy M Dove
(74) *Attorney, Agent, or Firm* — Birch, Stewart, Kolasch & Birch, LLP

(57) ABSTRACT

A negative electrode slurry composition including (1) clay particles having, a plate-type structure and an average particle diameter ($D_{50}$) of 10 nm to 2 μm, (2) carboxymethylcellulose (CMC), (3) a negative electrode active material, and (4) an aqueous solvent, wherein a weight ratio of the carboxymethylcellulose and the clay particles is 9.5:0.5 to 4:6. The negative electrode slurry composition is capable of solving problems due to the deterioration of storage stability and dispersibility of solids in a negative electrode slurry composition having a high solid content.

17 Claims, 4 Drawing Sheets

(51) Int. Cl.
*H01M 4/133* (2010.01)
*H01M 4/62* (2006.01)
*H01M 10/052* (2010.01)
*H01M 4/02* (2006.01)

(52) U.S. Cl.
CPC .... *H01M 10/052* (2013.01); *H01M 2004/027* (2013.01)

(56) References Cited

U.S. PATENT DOCUMENTS

| | | | |
|---|---|---|---|
| 2003/0044686 A1 | 3/2003 | Bushong et al. | |
| 2004/0229116 A1 | 11/2004 | Malinski et al. | |
| 2007/0122709 A1* | 5/2007 | Pratt | H01M 4/624 429/232 |
| 2008/0063939 A1 | 3/2008 | Ryu et al. | |
| 2013/0011733 A1 | 1/2013 | Chang et al. | |
| 2013/0062571 A1 | 3/2013 | Lee et al. | |
| 2014/0093772 A1 | 4/2014 | Chang et al. | |
| 2016/0141609 A1* | 5/2016 | Mikuni | C01B 33/26 252/508 |
| 2018/0358622 A1 | 12/2018 | Yoo et al. | |

FOREIGN PATENT DOCUMENTS

| | | |
|---|---|---|
| CN | 103081181 A | 5/2013 |
| EP | 1 393 393 B1 | 5/2011 |
| JP | 10-106542 A | 4/1998 |
| JP | 2013-134896 A | 7/2013 |
| JP | 5560337 B2 | 7/2014 |
| KR | 10-2008-0023373 A | 3/2008 |
| KR | 10-2013-0005876 A | 1/2013 |
| KR | 10-2013-0029265 A | 3/2013 |
| KR | 10-2016-0039979 A | 4/2016 |
| KR | 10-2016-0039980 A | 4/2016 |
| KR | 10-2017-0055359 A | 5/2017 |

OTHER PUBLICATIONS

Dreger et al., Influence of dispersing by extrusion and calendaring on the performance of lithium-ion battery electrodes, J. of Energy Storage, vol. 21, p. 231-240, Feb. 2019. (Year: 2019).*
BYK Additives & Instruments, "Additives for Electrical Energy Storage & Conversion," Technical Information B-TI 2, Sep. 20, 2017, pp. 1-16.
BYK, "BYK Additive for Electrodes for Li-Ion Batteries," Sep. 20, 2017, 5 pages.
International Search Report (PCT/ISA/210) issued in PCT/KR2018/013414, dated Apr. 11, 2019.
Von Hagen et al., "Laponite as an Additive in Lithium-ion Battery Electrodes," BYK Additives & Instruments, Sep. 20. 2017, 14 pages.
Extended European Search Report, dated Oct. 22, 2020, for European Application No. 18873570.8.
Konta, "Clay and Man: Clay Raw Materials in the Service of Man," Applied Clay Science, vol. 10, 1995 (Jan. 1, 1995), pp. 275-335 , XP002532263.
Liu et al., "Understanding Different Roles of Lignosuffonate in Dispersing Clay Minerals in Coal Flotation Using Deionised Water and Saline Water," Fuel, vol. 142, 2015 (Available online Nov. 18, 2014), pp. 235-242, XP029100230.

* cited by examiner

NEGATIVE ELECTRODE SLURRY COMPOSITION FOR LITHIUM SECONDARY BATTERY, AND METHOD FOR PREPARING THE SAME

CROSS-REFERENCE TO RELATED APPLICATIONS

This application claims the benefit of Korean Patent Application No. 10-2017-0146895, filed on Nov. 6, 2017, in the Korean Intellectual Property Office, the disclosure of which is incorporated herein in its entirety by reference.

TECHNICAL FIELD

Technical Field

The present invention relates to a negative electrode slurry composition for a lithium secondary battery, and a method for preparing the same, and more particularly, to a negative electrode slurry composition in which the problem of a decrease in storage stability due to the sedimentation of solid particles in a negative electrode slurry composition having a high solid content is solved, and a method for preparing the same.

BACKGROUND ART

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

An electrode of a lithium secondary battery is manufactured by mixing a positive electrode active material or a negative electrode active material with a binder resin component and dispersing the mixture in a solvent to prepare a slurry, and applying the slurry on the surface of an electrode current collector, following by drying to form a mixture layer.

In the case of the negative electrode slurry composition, the active material that occupies most of the negative electrode slurry composition is mainly a graphite-based active material dispersed in water. However, the graphite-based active material is hydrophobic, and thus is not easy to be dispersed in water. In addition, the graphite-based active material is settled in the slurry over time, and thus, may cause the storage stability problem of the slurry. In particular, attempts to increase the solid content in a negative electrode slurry composition have been made in order to increase the amount of negative electrode loading, improve the efficiency during a drying process, and improve the migration of a binder when manufacturing a negative electrode. The dispersion problem results in a filter plugging phenomenon during the transfer of the negative electrode slurry composition when manufacturing the negative electrode, so that the efficiency of the entire lithium secondary battery manufacturing process is reduced. The deterioration of the slurry storage stability results in the formation of a non-uniform coating layer when manufacturing the negative electrode, so that the composition of the negative electrode varies from part to part, which has become an important issue.

In order to solve the dispersion and storage stability problems of the graphite-based active material as described above, a method of increasing the amount of a thickener used in the negative electrode slurry composition or using a high molecular weight thickener has been attempted. However, the additional use of a thickener causes a decrease in the content of the other components in the slurry, thereby deteriorating battery performance. In addition, the use of a high molecular weight thickener has a limitation in that the concentration of the thickener itself must be lowered due to the solubility problem thereof, so that the solid content of the slurry is reduced, thereby deteriorating productivity and efficiency of the manufacturing process.

Therefore, the development of a new technology which is excellent in improving the dispersion of a graphite-based active material in a negative electrode slurry composition and increasing the solid content of the negative electrode slurry composition is required.

DISCLOSURE OF THE INVENTION

Technical Problem

An aspect of the present invention provides a negative electrode slurry composition with improved storage stability and dispersion of a negative electrode active material while having a high solid content.

Another aspect of the present invention provides a method for preparing the negative electrode slurry composition.

Yet another aspect of the present invention provides a negative electrode for a lithium secondary battery comprising the negative electrode slurry composition, and a lithium secondary battery comprising the negative electrode.

Technical Solution

According to an aspect of the present invention, there is provided a negative electrode slurry composition comprising (1) clay particles having a plate-type structure and an average particle diameter ($D_{50}$) of 10 nm to 2 μm, (2) carboxymethylcellulose (CMC), (3) a negative electrode active material, and (4) an aqueous solvent, wherein a weight ratio of the carboxymethylcellulose and the clay particles is 9.5:0.5 to 4:6.

According to another aspect of the present invention, there is provided a method for preparing a negative electrode slurry composition comprising (A) preparing a first mixture comprising clay particles having a plate-type structure and an average particle diameter ($D_{50}$) of 10 nm to 2 μm carboxymethylcellulose (CMC), and an aqueous solvent; (B) preparing a second mixture by adding a negative electrode active material to the first mixture; and (C) preparing a negative electrode slurry composition by adding a binder to the second mixture, wherein the weight ratio of the carboxymethylcellulose and the clay particles is 9.5:0.5 to 4:6.

According to yet another aspect of the present invention, there are provided a negative electrode for a lithium secondary battery comprising the negative electrode slurry composition, and a lithium secondary battery comprising the negative electrode.

Advantageous Effects

A negative electrode slurry composition according to the present invention has a high solid content, thereby achieving a large amount of negative electrode loading. In addition, the storage stability and dispersion of a negative electrode active material are improved, so that the non-uniformity of a negative electrode and problems in a manufacturing process of the negative electrode due to the deterioration of storage stability and the deterioration of dispersion of the negative electrode slurry composition having a high solid content may be solved.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Negative Electrode Slurry Composition

First, a negative electrode slurry composition according to the present invention will be described.

The negative electrode slurry composition of the present invention may be a negative electrode slurry composition for a lithium secondary battery, and comprises (1) clay particles having a plate-type structure and an average particle diameter ($D_{50}$) of 10 nm to 2 μm, (2) carboxymethylcellulose (CMC), (3) a negative electrode active material, and (4) an aqueous solvent, wherein the weight ratio of the carboxymethylcellulose and the clay particles is 9.5:0.5 to 4:6.

The negative electrode slurry composition of the present invention comprises clay particles together with carboxymethylcellulose (CMC), thereby exhibiting excellent storage stability since the clay particles increase the thickening effect of the carboxymethylcellulose.

The negative electrode slurry composition comprises the aqueous solvent, and the aqueous solvent may specifically contain water. In one example of the present invention, the negative electrode slurry composition may be prepared by first mixing the clay particles and the carboxymethylcellulose with the aqueous solvent, specifically water, and then mixing the negative electrode active material therewith.

The clay particles have a plate-type structure and an average particle diameter ($D_{50}$) of 10 nm to 2 μm. At the surface of the clay, an edge portion of the plate may represent a partially positive charge ($\delta^+$), and an inner surface portion of the edge of the plate may represent a partially negative charge ($\delta^-$). Since the edge portion of the clay particles represents a partially positive charge ($\delta^+$), when the clay particles and the carboxymethylcellulose are mixed in an aqueous solution, the edge portion of the clay particles and a carboxy group of a carboxymethyl cellulose molecular chain may interact through a polar interaction or a dipole interaction. Accordingly, the clay particle is positioned between a plurality of carboxymethylcellulose molecules and serves to cross-link, thereby increasing the viscosity of the carboxymethylcellulose which is used as a thickener in the negative electrode slurry composition.

Figure 1:
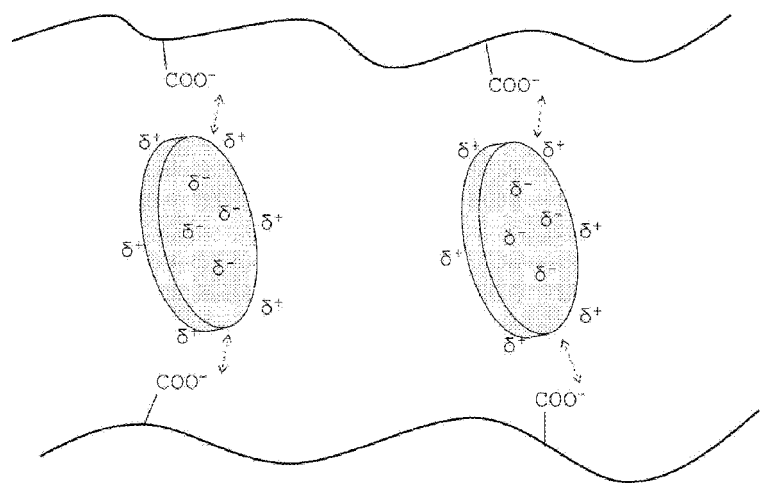
FIG. 1 is a view schematically showing the interaction between clay particles and carboxymethylcellulose (CMC) in a negative electrode slurry composition according to one example of the present invention.

FIG. 1 is a view schematically showing the interaction between clay particles and carboxymethylcellulose (CMC) in a negative electrode slurry composition according to one example of the present invention. Referring to FIG. 1, an inner surface 110 of a clay particle 100 represents a partially negative charge ($\delta^-$) and an edge (120) portion represents a partially positive charge ($\delta^+$), and thus interacts with a negative charge of carboxy groups 210 and 201' which are functional groups present in carboxymethylcellulose molecules 200 and 200' through a polar interaction. Accordingly, the clay particle 100 serves to cross-link between the carboxyl groups 210 and 201', thereby increasing the viscosity of the carboxymethylcellulose in the aqueous solvent.

The clay particles may contain a 2:1 type clay mineral having a ratio of a tetrahedral sheet and an octahedral sheet of 2:1, and may be that two or more layers in which an octahedral sheet is sandwiched between tetrahedral plates are laminated.

When the clay particles contain a 2:1 type clay mineral having a ratio of a tetrahedral sheet and an octahedral sheet of 2:1, a portion from the outer surface to an edge portion of the clay particle may represent a partially positive charge (δ+), and an inner surface portion of the clay particle may represent a partially negative charge (δ−), so that the clay particle is positioned between carboxymethylcellulose molecules and may appropriately serve to cross-link.

Meanwhile, in one example of the present invention, in an interlayer which is a space between the layers of the clay particles, an adsorbed cation and/or water may be present.

The clay may be, for example, a smectite-based clay mineral. The clay particles may specifically comprise one or more selected from the group consisting of hectorite, saponite, and bentonite. More specifically, the hectorite, saponite, and bentonite are respectively laponite (BYK Co.), sumecton (Kunimine Industries CO.), and cloisite (BYK Co.), all of which are commercially available.

In one example of the present invention, the clay particles may have an average particle diameter ($D_{50}$) of 10 nm to 2 μm, specifically 20 nm to 1.8 μm, more specifically 25 nm to 1.7 μm. The average particle diameter ($D_{50}$) of the clay particles may refer to an average particle diameter ($D_{50}$) of clay particles dispersed in water in an amount of 1.1 wt %.

When the clay particles have an average particle diameter ($D_{50}$) in the above range, the storage stability of the negative electrode slurry composition may be improved, and the dispersion of solids in the negative electrode slurry composition may be improved. When the average particle diameter ($D_{50}$) of the clay particles is less or greater than the above range, the storage stability improvement effect may not be exhibited. Particularly, when the average particle diameter ($D_{50}$) of the clay particles is greater than the above range, the deterioration of the storage stability may be more prominent.

The carboxymethyl cellulose (CMC) is a thickener, and the negative electrode slurry composition may comprise the carboxymethyl cellulose in an amount of 0.1 wt % to 3 wt %, specifically, 0.2 wt % to 2 wt %, more specifically 0.5 wt % to 1.5 wt % based on the total weight of solids of the negative electrode slurry composition.

When the negative electrode slurry composition comprises the thickener in the above range, an appropriate thickening effect may be exhibited so that the storage stability of the slurry may be secured. In addition, the thickener is included in the negative electrode slurry composition within a predetermined content, thereby not affecting the performance of a battery.

In one example of the present invention, the weight ratio of the carboxymethyl cellulose and the clay particles may be 9.5:0.5 to 4:6, specifically 9:1 to 5:5. When the weight ratio of the carboxymethyl cellulose and the clay satisfies the above range, the viscosity of the carboxymethyl cellulose may be appropriately increased according to the inclusion of the clay, so that the storage stability of the negative electrode slurry composition may be improved.

When the ratio of the carboxymethyl cellulose to the clay is higher than the above range, the viscosity increase effect according to the inclusion of the clay particles may not be significant. Alternatively, when the ratio of the clay particles to the carboxymethyl cellulose is higher than the above range, the viscosity of the negative electrode slurry composition may be excessively increased, and filter clogging may occur due to the dispersibility problem of solids in the negative electrode slurry composition or the deterioration of wetting properties.

As the negative electrode active material, a compound capable of reversible intercalation and de-intercalation of lithium may be used. Specific examples thereof may comprise a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_x(0<x<2)$, $SnO_2$, vanadium oxide, lithium titanium oxide, and lithium vanadium oxide; or a composite comprising the metallic compound and the carbonaceous material such as a Si—C composite or a Sn—C composite, and any one thereof or a mixture of two or more thereof may be used. Both low crystalline carbon and high crystalline carbon may be used as the carbonaceous material. Typical examples of the low crystalline carbon may comprise soft carbon and hard carbon, and typical examples of the high crystalline carbon may comprise irregular, planar, flaky, spherical, fibrous, or plate-type natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Specifically, in one example of the present invention, the negative electrode active material may be spherical, fibrous, or plate-type natural graphite or artificial graphite, or a mixture thereof.

The negative electrode active material may have an average particle diameter ($D_{10}$) of 1 μm to 20 μm, specifically 5 μm to 15 μm, more specifically 8 μm to 12 μm, have an average particle diameter ($D_{50}$) of 10 μm to 30 μm, specifically 15 μm to 25 μm, more specifically 18 μm to 22 μm, and have an average particle diameter ($D_{90}$) of 20 μm to 45 μm, specifically 25 μm to 40 μm, more specifically 30 μm to 36 μm, When the negative electrode active material satisfies the ranges of the average particle diameter ($D_{10}$), average particle diameter ($D_{50}$), and average particle diameter ($D_{90}$), excellent output and initial efficiency may be combined, and excellent tap density may be exhibited, and when coating an electrode, an excellent loading amount may be exhibited.

When the diameter of the negative electrode active material is excessively small, initial efficiency may be reduced due to the increase of the specific surface area. When the diameter of the negative electrode active material is excessively large, the initial efficiency is increased, whereas the output properties and the storage stability of the negative electrode slurry composition may be deteriorated. The negative electrode active material satisfies the ranges of the average particle diameter ($D_{10}$), average particle diameter ($D_{50}$), and average particle diameter ($D_{90}$), and thus having appropriately matched output properties, initial efficiency, and storage stability.

In the present invention, the average diameter ($D_{50}$) may be defined as a diameter at 50% in a diameter distribution. Also, the average particle diameter ($D_{10}$) may be defined as a particle diameter at 10% in a particle diameter distribution, and the average particle diameter ($D_{50}$) may be defined as a particle diameter at 50% in a particle diameter distribution. The average particle diameter ($D_{90}$) may be defined as a particle diameter at 90% in a particle diameter distribution.

The average particle diameters are not particularly limited, but may be measured by a laser diffraction method or by using a SEM photograph. When using the laser diffraction method, it is possible to measure a particle diameter of from a submicron region to several millimeters, and thus it is possible to obtain results with high reproducibility and high degradability.

The negative electrode slurry composition may comprise the negative electrode active material in an amount of 77.5 wt % to 99 wt %, specifically 80 wt % to 98.5 wt % based on the total weight of solids of the negative electrode slurry composition.

The negative electrode slurry composition may further comprise a conductive agent. The conductive agent is not particularly limited as long as it has conductivity without causing a chemical change in the battery. Examples of the conductive agent may comprise graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. The conductive agent may be used in an amount of 0.1 wt % to 9 wt % based on the total weight of solids of the negative electrode slurry composition.

In addition, the negative electrode slurry composition may further comprise a dispersant, and the dispersant may specifically be an aqueous dispersant.

Examples of the dispersant may comprise a cellulose-based compound, polyvinyl alcohol, polyvinyl pyrrolidone, polyvinyl acetal, polyvinyl ether, polyvinyl sulfonic acid, polyvinyl chloride (PVC), poly-vinylidene fluoride, chitosan, starch, amylose, polyacrylamide, poly-N-isopropyl acrylamide, poly-N, N-dimethyl acrylamide, polyethylene imine, polyoxyethylene, poly(2-methoxyethoxyethylene), poly(acrylamide-co-diallyl dimethyl ammonium chloride), acrylonitrile/butadiene/styrene (ABS) polymer, acrylonitrile/styrene/acrylic ester (ASA) polymer, a mixture of acrylonitrile/styrene/acrylic ester (ASA) polymer and propylene carbonate, styrene/acrylonitrile (SAN) copolymer, or methyl methacrylate/acrylonitrile/butadiene/styrene (MABS) polymer, and the like, and any one thereof or a mixture of two or more thereof may be used.

The negative electrode slurry composition may comprise the dispersant in an amount of 0.01 wt % to 0.5 wt %, specifically 0.05 wt % to 0.5 wt %, more specifically 0.1 wt % to 0.3 wt % based on the total weight of solids of the negative electrode slurry composition.

When the negative electrode slurry composition comprises the dispersant in the above range, the dispersant may appropriately improve the dispersibility of the negative electrode slurry composition and the dispersant is included in the negative electrode slurry composition within a predetermined content, thereby not deteriorating the performance of a battery.

The negative electrode slurry composition according to an example of the present invention has a sedimentation height of 10 mm or less, specifically 7 mm or less, more specifically 5 mm or less, where the sedimentation height is measured by filling the negative electrode slurry composition to a height of 135 mm in a glass cylinder having an inner diameter of 8 mm, and then 24 hours later, allowing the negative electrode slurry composition to sink downwards from the height of 135 mm.

Since the negative electrode slurry composition comprises clay particles having an average particle diameter ($D_{50}$) of 10 nm to 2 μm and carboxymethyl cellulose at a weight ratio of 9.5:0.5 to 4:6, the clay particles increase the thickening effect of the carboxymethylcellulose, so that excellent storage stability may be exhibited, and therefore the sedimentation height of said range may be exhibited.

Also, the negative electrode slurry composition according to an example of the present invention may have an intensity of force acting at a height of 10 mm from a bottom of 1 N or less, specifically 0.5 N or less, more specifically 0.1 N or less, where the intensity of force is measured by filling the negative electrode slurry composition to a height of 50 mm in a glass cylinder having an inner diameter of 25 mm, and then 24 hours later, moving a rectangular stick having a thickness of 5 mm in all directions from top to bottom at a speed of 1 mm/s. The intensity of force acting at a height of 10 mm from a bottom refers to the hardness of a sediment of the negative electrode slurry composition when the negative electrode slurry composition is filled in a cylinder and left unattended for 24 hours.

Since the negative electrode slurry composition comprises clay particles having an average particle diameter ($D_{50}$) of 10 nm to 2 μm and carboxymethyl cellulose at a weight ratio of 9.5:0.5 to 4:6, the clay particles increase the thickening effect of the carboxymethylcellulose, so that excellent storage stability may be exhibited and the hardness of a sediment 24 hours later may exhibit the above value.

Meanwhile, the negative electrode slurry composition according to an example of the present invention may have a shear thickening slope value of 0.3 or less, specifically 0.25 or less, more specifically 0.2 or less, when measuring a shear viscosity.

When measuring a shear viscosity of the negative electrode slurry composition, if the shear thickening slope value satisfies the above range, the negative electrode slurry composition may easily pass through a filter, specifically, a filter of 100 mesh, so that the filter may not be clogged when the negative electrode slurry composition passes the same. When there is less shear phenomenon, the negative electrode slurry composition may more easily pass through a filter. A negative electrode slurry composition, which tends to thicken significantly when a strong shear is applied to a filter, is more likely to clog the filter, and such tendency may be quantitatively assessed based on the shear thickening slope value of the negative electrode slurry composition.

The shear thickening slope value represents a slope value of a straight line graph, the straight line graph which is drawn by first measuring a viscosity according to the shear rate of the negative electrode slurry composition using a rheometer, and then changing a viscosity value of an interval representing shear thickening in the measured viscosity into a log value, and linear fitting from a starting point to an ending point of the shear thickening.

In one example of the present invention, the shear thickening slope value of the negative electrode slurry composition may be obtained by controlling the weight ratio of clay particles and carboxymethyl cellulose and the average particle diameter ($D_{50}$) and kind of clay, and by controlling the solid content in the step of mixing the clay particles, carboxymethyl cellulose (CMC) and negative electrode active material with an aqueous solvent.

Specifically, the negative electrode slurry composition having the shear thickening slope value as described above may be prepared by comprising clay particles having a plate-type structure and an average particle diameter ($D_{50}$) of 10 nm to 2 μm and carboxymethylcellulose (CMC) together, wherein the weight ratio of the carboxymethylcellulose and the clay particles is 9.5:0.5 to 4:6, and the solid content in the step of mixing the clay particles, carboxymethyl cellulose (CMC) and negative electrode active material with an aqueous solvent satisfies 50 wt % to 60 wt %.

The negative electrode slurry composition exhibits excellent storage stability and dispersion while having a high solid content, specifically, 45 wt % or greater, more specifically 45 wt % to 50 wt %, so that the clogging of a filter during the transport of the negative electrode slurry composition may be suppressed.

Also, the negative electrode slurry composition according to one example of the present invention may have a viscosity of 8,000 cp or less, specifically 200 cp to 7,000 cp, more specifically 600 cp to 6,000 cp.

When the viscosity of the negative electrode slurry composition satisfies the above range, when manufacturing an electrode using the negative electrode slurry composition, there are no tube transfer issues or filter clogging issues which may be caused by a slurry. In addition, solids included in the negative electrode slurry composition are stably dispersed, so that excellent storage stability may be exhibited.

In addition, the negative electrode slurry composition according to one example of the present invention may have a phase angle of 25° or higher, specifically 30° or higher, more specifically 45° or higher. When the phase angle is excessively low, the flowability of the negative electrode slurry composition is not good, so that there may be problems in the manufacturing process of a negative electrode.

The phase angle is a viscoelastic parameter, and may be represented by tan(phase angle)=G'/G" [wherein G' is an elastic modulus and G" is a viscous modulus]. When the phase angle is 45° or lower, the elasticity of the negative electrode slurry composition is more excellent, and when 45° or higher, the viscosity of the negative electrode slurry composition is more excellent. As the phase angle is higher, the negative electrode slurry composition has liquid-like properties and as the phase angle is lower, the negative electrode slurry composition has solid-like properties. As the negative electrode slurry composition has properties similar to those of a liquid, the physical properties of the negative electrode slurry composition are more excellent.

Preparation Method of Negative Electrode Slurry Composition

Next, a method for preparing a negative electrode slurry composition according to the present invention will be described.

The negative electrode slurry composition according to the present invention may be prepared by a preparation method comprising steps of (a) preparing a first mixture comprising clay particles having a plate-type structure and an average particle diameter ($D_{50}$) of 10 nm to 2 µm, carboxymethylcellulose (CMC), and an aqueous solvent, (b) preparing a second mixture by adding a negative electrode active material to the first mixture, and (c) preparing a negative electrode slurry composition by adding a binder to the second mixture. At this time, the weight ratio of the carboxymethyl cellulose and the clay particles is 9.5:0.5 to 4:6.

Hereinafter, each step will be described in detail.

(A) Preparing First Mixture Comprising Clay Particles Having Plate-Type Structure and Average Particle Diameter ($D_{50}$) of 10 nm to 2 µm, Carboxymethylcellulose (CMC), and Aqueous Solvent The method for preparing a negative electrode slurry composition is first subjected to a step of (1) preparing a first mixture comprising clay particles having a plate-type structure and an average particle diameter ($D_{50}$) of 10 nm to 2 µm, carboxymethylcellulose (CMC), and an aqueous solvent.

The first mixture may have a solid content of 50 wt % to 60 wt %, specifically 55 wt % to 60 wt %. When the solid content of the first mixture is 50 wt % to 60 wt %, a negative electrode slurry composition with low shear thickening may be prepared, so that filter clogging may be minimized.

The preparation of the first mixture may be performed by mixing all components at once, or may be performed by mixing some components first and then the rest later. For example, the clay particles and the carboxymethylcellulose may be respectively dispersed and mixed in a separate aqueous solvent to prepare a clay aqueous solution and a carboxymethylcellulose aqueous solution, and then the first mixture may be prepared by mixing the clay aqueous solution and the carboxymethylcellulose aqueous solution.

Since the clay particles and the carboxymethylcellulose are mixed with an aqueous solution to prepare the first mixture, the viscosity in the carboxymethylcellulose aqueous solution may be increased through a polar interaction of a positive charge (δ+) at an edge portion of the clay particle and a carboxy group of the carboxymethylcellulose.

The mixing of the clay aqueous solution and the carboxymethylcellulose aqueous solution may be performed at a rate of 500 rpm to 5,000 rpm, specifically 2,000 rpm to 4,000 rpm for 1 minute to 30 minutes, specifically for 5 minutes to 20 minutes.

Meanwhile, the method for preparing a negative electrode slurry composition according to one example of the present invention may further comprise a step of (A-1) mixing a conductive agent with the first mixture after the step of preparing a first mixture of step (A) and before step (B). Therefore, the first mixture may further comprise a conductive agent.

In one example of the present invention, the mixing of the conductive agent with the first mixture may be performed at a rate of 200 rpm to 3,000 rpm, specifically 500 rpm to 2,000 rpm for 1 minute to 30 minutes, specifically for 5 minutes to 20 minutes.

(B) Preparing Second Mixture by Adding Negative Electrode Active Material to First Mixture Next, in step (B), a second mixture is prepared by adding a negative electrode active material to the first mixture.

A process in which the first mixture is added with the negative electrode active material and then mixed there together may be performed. The mixing process may be performed at a rate of 10 rpm to 300 rpm, specifically 50 rpm to 100 rpm for 10 minutes to 1 hour, specifically for 20 minutes to 40 minutes.

In one example of the present invention, the mixing process in step (A), step (A-1), and step (B) may be performed by a typical mixing method, for example, a milling method such as ball milling, bead milling, basket milling, or planetary-milling, or a method using a mixing device such as a homo disper mixer, a homogenizer, a beads mill, a ball mill, a basket mill, an attrition mill, a universal stirrer, a clear mixer, or a TK mixer.

(C) Preparing Negative Electrode Slurry Composition by Adding Binder to Second Mixture When the second mixture is prepared as described above, a negative electrode slurry composition is prepared by adding a binder to the second mixture.

In step (B), a binder may be added as a solution containing the binder and the aqueous solvent, and a negative electrode slurry composition may be prepared by introducing a solution comprising a binder to the second mixture and mixing the same.

The mixing of the second mixture and a binder may be performed at a rate of 100 rpm to 1,000 rpm, specifically 200 rpm to 800 rpm for 1 minute to 30 minutes, specifically for 5 minutes to 20 minutes.

In step (B), the binder may be dispersed in the aqueous solvent and added as a solution containing a binder and an aqueous solvent, and in step (B), a process for controlling the solid content of a negative electrode slurry composition to be prepared may be additionally performed through a solvent contained in the solution.

Meanwhile, in one example of the present invention, after the second mixture is prepared in step (B) and before the binder is added in step (C), an additional step (B-1) of further introducing clay particles having a plate-type structure and an average particles diameter ($D_{50}$) of 10 nm to 2 µm, carboxymethylcellulose (CMC), and an aqueous solvent may be performed. Using the aqueous solution additionally introduced in step (B-1), the process for controlling the solid content of a negative electrode slurry composition may be additionally performed.

The mixing process of step (B-1) may be performed through a mixing process of two steps. Specifically, step (B-1) may comprise a mixing process of two steps having different stirring speed and stirring time. The two-step mixing process may comprise a first mixing step which is performed at a rate of 10 rpm to 300 rpm, specifically 50 rpm to 100 rpm for 1 minute to 30 minutes, specifically 5 minutes to 20 minutes, and then a following second mixing step which is performed at a rate of 200 rpm to 3,000 rpm, specifically 500 rpm to 2,000 rpm for 20 minutes to 2 hours, specifically 30 minutes to 1 hour.

The binder is not particularly limited as long as it is a binder typically used in preparing a slurry for a negative electrode active material. For example, any one selected from the group consisting of acrylonitrile-butadiene rubber, styrene-butadiene rubber, and acrylic rubber, which are aqueous binders, or a mixture of two or more thereof may be used.

The binder may be included in an amount of 10 wt % or less, specifically 0.1 wt % to 10 wt %, more specifically 0.5 wt % to 4 wt % based on the total weight of solids of the negative electrode slurry composition. If the content of the binder is less than 0.1 wt %, it is not desirable since the effect of using the binder is insignificant, and if the content is greater than 10 wt %, it is not desirable since the capacity per volume may be reduced due to a relative decrease in the content of the active material according to an increase in the content of the binder.

The negative electrode slurry composition of the present invention prepared by the above method may have a solid content of 45 wt % or greater, specifically 45 wt % to 50 wt %.

In addition, the present invention provides a negative electrode for a lithium secondary battery, the negative electrode comprising the negative electrode slurry composition.

In addition, the present invention provides a lithium secondary battery comprising the negative electrode.

The lithium secondary battery may comprise a positive electrode, a negative electrode, and a separator interposed between the positive electrode and the negative electrode.

The negative electrode may be manufactured by a typical negative electrode manufacturing method known in the art by using a negative electrode slurry composition prepared by the negative electrode slurry composition preparation method described above.

The amount of the solvent to be used is sufficient if the solvent may dissolve and disperse the negative electrode active material, the binder, and the conductive agent in consideration of an applying thickness of a slurry and preparing yield.

A negative electrode current collector used in the negative electrode according to an embodiment of the present invention may have a thickness of 3 μm to 500 μm. The negative electrode current collector is not particularly limited as long as it has conductivity without causing a chemical change in the battery. For example, copper, gold, stainless steel, aluminum, nickel, titanium, fired carbon, copper or stainless steel that is surface-treated with one of carbon, nickel, titanium, silver, and the like, and an aluminum-cadmium alloy may be used. Also, microscopic irregularities may be formed on the surface of the negative electrode current collector to improve the adhesion of a negative electrode active material, and the negative electrode current collector may be used in various forms of such as a film, a sheet, a foil, a net, a porous body, a foam body, and a non-woven fabric body.

The negative electrode slurry composition may comprise a filler when necessary.

The filler is a component assisting in suppressing the expansion of an electrode, and is not particularly limited as long as it is a fibrous material without causing chemical change in the battery. For example, the filler may be an olefin-based polymer such as polyethylene and polypropylene, or a fibrous material such as glass fiber and carbon fiber.

The positive electrode may be manufactured by a typical method known in the art. For example, a positive electrode may be manufactured by mixing and stirring a positive electrode active material with a solvent, the binder, a conductive agent, and a dispersant to prepare a slurry, and applying (coating) the slurry on a current collector of a metal material, followed by pressing and drying.

The current collector of a metal material is a metal having high conductivity, and is not particularly limited as long as it is a metal to which the slurry of the positive electrode active material can be easily bonded and which has high conductivity without causing a chemical change in the battery. For example, stainless steel, aluminum, nickel, titanium, fired carbon, or aluminum or stainless steel that is surface-treated with one of carbon, nickel, titanium, silver, and the like may be used. In addition, microscopic irregularities may be formed on the surface of the current collector to improve the adhesion of the positive electrode active material. The current collector may be used in various shapes such as that of a film, a sheet, a foil, a net, a porous body, a foam body, a non-woven fabric body, and the like, and may have a thickness of 3 μm to 500 μm.

The positive electrode active material may be, for example, a lithium cobalt oxide ($LiCoO_2$); a lithium nickel oxide ($LiNiO_2$); $Li[Ni_aCo_bMn_cM^1_d]O_2$ (wherein $M^1$ is one element selected from the group consisting of Al, Ga, and In, or two or more elements thereof, and $0.3 \leq a < 1.0$, $0 \leq b \leq 0.5$, $0 \leq c \leq 0.5$, $0 \leq d \leq 0.1$, and $a+b+c+d=1$); a layered compound such as $Li(Li_eM^2_{f\text{-}e\text{-}f'}M^3_{f'})O_{2\text{-}g}A_g$ (wherein $0 \leq e \leq 0.2$, $0.6 \leq f \leq 1$, $0 \leq f' \leq 0.2$, and $0 \leq g \leq 0.2$, and $M^2$ comprises one or more selected from the group consisting of Mn, Ni, Co, Fe, Cr, V, Cu, Zn, and Ti, $M^3$ is one or more selected from the group consisting of Al, Mg, and B, and A is one or more selected from the group consisting of P, F, S, and N), or a compound substituted with one or more transition metals; a lithium manganese oxide such as $Li_{2+h}Mn_{2\text{-}h}O_4$ (wherein $0 \leq h \leq 0.33$), $LiMnO_2$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni-site type lithium nickel oxide represented by Formula $LiNi_{1\text{-}i}M^4_iO_2$ (wherein $M^4$ is any one of Co, Mn, Al, Cu, Fe, Mg, B, or Ga and $0.01 \leq i \leq 0.3$); a lithium manganese complex oxide represented by Formula $LiMn_{2\text{-}j}M^5_jO_2$ (wherein $M^5$ is any one of Co, Ni, Fe, Cr, Zn, or Ta, and $0.01 \leq j \leq 0.1$) or Formula $Li_2Mn_3M^6O_8$ (wherein $M^6$ is any one of Fe, Co, Ni, Cu, or Zn); $LiMn_2O_4$ in which a part of Li in the formula is substituted with an alkaline earth metal ion; a disulfide compounds; $LiFe_3O_4$, $Fe_2(MoO_4)_3$, and the like, but is not limited thereto.

The positive electrode active material may be included in an amount of 50 wt % to 99 wt %, specifically 70 wt % to 98 wt % based on the total weight of solids of the positive electrode slurry.

Examples of a solvent for forming the positive electrode may comprise an organic solvent such as N-methyl pyrrolidone (NMP), dimethyl formamide (DMF), acetone, and dimethyl acetamide, or water, and such solvent may be used alone or in combination of two or more thereof. The amount of a solvent to be used is sufficient if the solvent may dissolve and disperse the positive electrode active material, the binder, and the conductive agent in consideration of an applying thickness of a slurry and preparing yield.

The conductive agent is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used. The conductive agent may be used in an amount of 1 wt % to 20 wt % based on the total weight of solids of the positive electrode slurry.

The dispersant may be an aqueous dispersant or an organic dispersant agent such as N-methyl-2-pyrrolidone. The dispersant may be used in an amount of 0.01 wt % to 10 wt % based on the total weight of solids of the positive electrode slurry.

Meanwhile, as a separator, a typical porous polymer film used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or a laminated structure thereof may be used. Alternatively, a typical porous non-woven fabric, for example, a non-woven fabric formed of high melting point glass fibers or polyethylene terephthalate fibers may be used, but the embodiment of the present invention is not limited thereto.

A lithium salt which may be included as an electrolyte used in the present invention may be used without limitation as long as it is typically used as an electrolyte for a lithium secondary battery. For example, as anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^{31}$, $SCN^-$, and $(CF_3CF_2SO_2)_2N$.

In an electrolyte used in the present invention, an organic solvent included the electrolyte may be used without limitation as long as it is typically used in an electrolyte for a secondary battery. Representative examples thereof may be any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran, or a mixture of two or more thereof. Specifically, among the carbonate-based organic solvents, ethylene carbonate and propylene carbonate, which are cyclic carbonates, are organic solvents of high viscosity and have high dielectric constant so as to dissociate a lithium salt in an electrolyte well, and thus may be preferably used. When such a cyclic carbonate is mixed with a low viscosity, low dielectric constant linear carbonate such as dimethyl carbonate and diethyl carbonate in an appropriate ratio, an electrolyte having a high electrical conductivity may be prepared, and thus may be more preferably used.

Optionally, the electrolyte stored in accordance with the present invention may further include an additive such as overcharge protection agent contained in a typical electrolyte.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell used as a power source of a small-sized device, and may be preferably used as a unit cell in a medium- and large-sized battery module comprising a plurality of battery cells, as well.

Mode for Carrying Out the Invention

EXAMPLES

Hereinafter, the present invention will be described in more detail with reference to Examples and Experimental Examples. However, the present invention is not limited by these Examples and Experimental Examples. The embodiments according to the present invention may modified into various different forms, and the scope of the present invention should not be construed as being limited to the embodiments described below. The embodiments of the present invention are provided to more fully describe the present invention to those skilled in the art.

Example 1

Carboxymethylcellulose (CMC) and Hectorite [Product name: laponite, Manufacturer: BYK) having an average particle diameter ($D_{50}$) of 25 nm as clay particles were dispersed in distilled water, respectively, to prepare a carboxymethylcellulose aqueous solution and a clay aqueous solution of 1.1 wt % each. The carboxymethylcellulose aqueous solution and the clay aqueous solution were mixed at a weight ratio of 9:1, and then subjected to mixing at a rate of 3,000 rpm for 10 minutes using Homo disper mixer to prepare a mixed aqueous solution of carboxymethylcellulose and clay particles.

51.3 g of the mixed solution was mixed with 0.55 g of carbon black, and then subjected to mixing at a rate of 1,250 rpm for 10 minutes using Homo disper mixer to prepare a first mixture. To the first mixture, 70 g of artificial graphite having a particle size $D_{10}$ of 10±2 µm, $D_{50}$ of 20±2 µm, $D_{90}$ of 33±3 µm and a specific surface area of 1.5 m$^2$/g, was added. At a solid content of 58 wt %, mixing was performed at a rate of 75 rpm for 30 minutes using a planetary mixer (PRIMIX Co.'s HIVIS MIX® Model 2P-03) to prepare a second mixture. The second mixture was added with 25.3 g of the carboxymethylcellulose and clay particle mixed aqueous solution (1.1 wt %) prepared above and 11.0 g of water, and then subjected to an additional mixing at a rate of 75 rpm for 5 minutes, and then subjected to mixing at a rate of 1,250 rpm for 45 minutes using Homo disper mixer.

Thereto, 4.6 g of 40 wt % SBR binder emulsion aqueous solution was added, and the subjected to mixing at a rate of 500 rpm for 10 minutes using Homo disper mixer to prepare a negative electrode slurry composition. The solid content of the prepared negative electrode slurry composition was 45 wt %.

Example 2

A negative electrode slurry composition was prepared in the same manner as in Example 1 except that the carboxymethylcellulose aqueous solution and the clay aqueous solution were mixed at a weight ratio of 7:3. The solid content of the prepared negative electrode slurry composition was 45 wt %.

Example 3

A negative electrode slurry composition was prepared in the same manner as in Example 1 except that the carboxymethylcellulose aqueous solution and the clay aqueous solution were mixed at a weight ratio of 5:5. The solid content of the prepared negative electrode slurry composition was 45 wt %.

Example 4

A negative electrode slurry composition was prepared in the same manner as in Example 2 except that saponite [Product name: sumecton, Manufacturer: Kunimine Industries) having an average particle diameter ($D_{50}$) of 70 nm was used as the clay particles. The solid content of the prepared negative electrode slurry composition was 45 wt %.

Example 5

A negative electrode slurry composition was prepared in the same manner as in Example 2 except that saponite [Product name: sumecton, Manufacturer: Kunimine Industries) having an average particle diameter ($D_{50}$) of 150 nm was used as the clay particles. The solid content of the prepared negative electrode slurry composition was 45 wt %.

Example 6

A negative electrode slurry composition was prepared in the same manner as in Example 2 except that bentonite [Product name: cloisite, Manufacturer: BYK) having an average particle diameter ($D_{50}$) of 1.7 µm was used as the clay particles. The solid content of the prepared negative electrode slurry composition was 45 wt %.

Example 7

A negative electrode slurry composition was prepared in the same manner as in Example 1 except that the carboxymethylcellulose aqueous solution and the clay aqueous solution were mixed at a weight ratio of 9.5:0.5. The solid content of the prepared negative electrode slurry composition was 45 wt %.

Example 8

A negative electrode slurry composition was prepared in the same manner as in Example 1 except that the carboxymethylcellulose aqueous solution and the clay aqueous solution were mixed at a weight ratio of 4:6. The solid content of the prepared negative electrode slurry composition was 45 wt %.

Comparative Example 1

51.3 g of 1.1 wt % carboxymethylcellulose aqueous solution was mixed with 0.55 g of carbon black, and then subjected to mixing at a rate of 1,250 rpm for 10 minutes using Homo disper mixer to prepare a first mixture. To the first mixture, 70 g of artificial graphite having a particle size $D_{10}$ of 10±2 µm, $D_{50}$ of 20±2 µm, $D_{90}$ of 33±3 µm and a specific surface area of 1.5 m²/g, was added. At a solid content of 58 wt %, mixing was performed at a rate of 75 rpm for 30 minutes using a planetary mixer (PRIMIX Co.'s HIVIS MIX® Model 2P-03) to prepare a second mixture. The second mixture was added with 25.3 g of 1.1 wt % carboxymethylcellulose aqueous solution and 11.0 g of water, and then subjected to an additional mixing at a rate of 75 rpm for 5 minutes, and then subjected to mixing at a rate of 1,250 rpm for 45 minutes using Homo disper mixer.

Thereto, 4.6 g of 40 wt % SBR binder emulsion aqueous solution was added, and the subjected to mixing at a rate of 500 rpm for 10 minutes using Homo disper mixer to prepare a negative electrode slurry composition. The solid content of the prepared negative electrode slurry composition was 45 wt %.

Comparative Example 2

A negative electrode slurry composition was prepared in the same manner as in Example 2 except that montmorillonite [Product name: optigel, Manufacturer: BYK) having an average particle diameter ($D_{50}$) of 7.3 µm was used as the clay particles. The solid content of the prepared negative electrode slurry composition was 45 wt %.

Comparative Example 3

A negative electrode slurry composition was prepared in the same manner as in Example 2 except that montmorillonite [Product name: optigel, Manufacturer: BYK) having an average particle diameter ($D_{50}$) of 10.5 µm was used as the clay particles. The solid content of the prepared negative electrode slurry composition was 45 wt %.

Comparative Example 4

A negative electrode slurry composition was prepared in the same manner as in Example 1 except that the carboxymethylcellulose aqueous solution and the clay aqueous solution were mixed at a weight ratio of 9.7:0.3. The solid content of the prepared negative electrode slurry composition was 45 wt %.

Comparative Example 5

A negative electrode slurry composition was prepared in the same manner as in Example 1 except that the carboxymethylcellulose aqueous solution and the clay aqueous solution were mixed at a weight ratio of 3.5:6.5. The solid content of the prepared negative electrode slurry composition was 45 wt %.

Experimental Example 1: Storage Stability Test

<Measurement of Sedimentation Height>

The negative electrode slurry compositions each prepared in Examples 1 to 8 and Comparative Examples 1 to 5 were respectively filled in a glass cylinder having an inner diameter of 8 mm to a height of 135 mm, and 24 hours later, the sedimentation height was measured from the height of 135 mm downwards. The results are shown in Table 1 below.

<Measurement of Hardness of Sediment>

Figure 2:
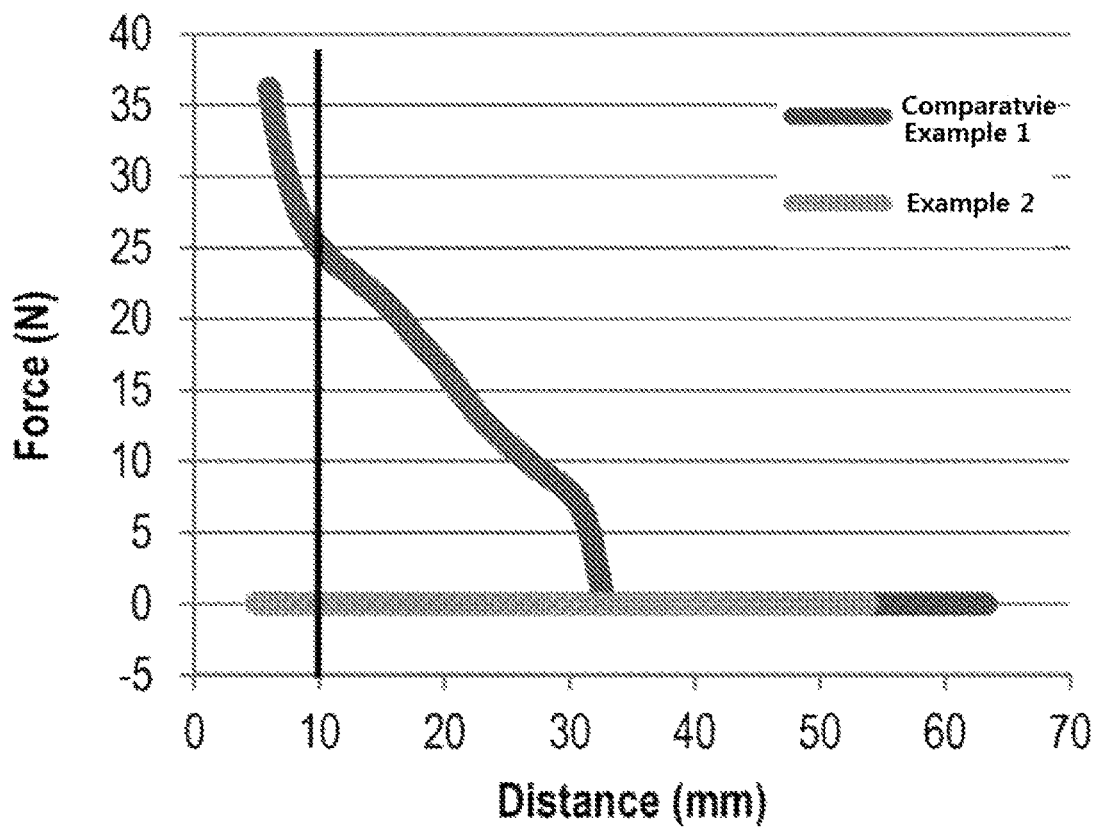
FIG. 2 is a view showing the results of measuring the sediment hardness of the negative electrode slurry compositions each prepared in Example 2 and Comparative Example 1.

The negative electrode slurry compositions each prepared in Examples 1 to 8 and Comparative Examples 1 to 5 were respectively filled in a glass cylinder having an inner diameter of 25 mm to a height of 50 mm, and then 24 hours later, the intensity of force acting at a height of 10 mm from a bottom was measured by moving a rectangular stick having a thickness of 5 mm in all directions from top to bottom at a speed of 1 mm/s. The results are shown in Table 1 and FIG. 2 below.

TABLE 1

| | CMC/Clay particles | Clay particle type | Sedimentation height (mm) | Sediment layer hardness measurement (N) |
|---|---|---|---|---|
| Example 1 | 9:1 | Hectorite (25 nm) | 2 | 0.03 |
| Example 2 | 7:3 | Hectorite (25 nm) | 1 | 0.02 |
| Example 3 | 5:5 | Hectorite (25 nm) | 1 | 0.03 |
| Example 4 | 7:3 | Hectorite (70 nm) | 1 | 0.03 |
| Example 5 | 7:3 | Saponite (150 nm) | 2 | 0.02 |
| Example 6 | 7:3 | Bentonite (1.7 μm) | 5 | 0.1 |
| Example 7 | 9.5:0.5 | Hectorite (25 nm) | 5 | 0.1 |
| Example 8 | 4:6 | Hectorite (25 nm) | 6 | 0.2 |
| Comparative Example 1 | 10:0 | — | 37 | 25 |
| Comparative Example 2 | 7:3 | Bentonite (7.3 μm) | 28 | 18 |
| Comparative Example 3 | 7:3 | Montmorillonite (10.5 μm) | 22 | 13 |
| Comparative Example 4 | 9.7:0.3 | Hectorite (25 nm) | 13 | 2.3 |
| Comparative Example 5 | 3.5:6.5 | Hectorite (25 nm) | 12 | 6.5 |

From the results shown in Table 1, it was confirmed that the negative electrode slurry compositions of Examples 1 to 8, which include clay particles having a plate-type structure and an average particle diameter ($D_{50}$) of 10 nm to 2 μm, carboxymethylcellulose (CMC), a negative electrode active material, and an aqueous solvent, have excellent storage stability since the degree of sedimentation thereof after 24 hours was low and the hardness of the sediment layer was low. However, it was confirmed that the negative electrode slurry compositions of Comparative Examples 1 to 2, which do not include clay particles or include clay particles having a diameter not in the average particle diameter ($D_{50}$) range of 10 nm to 2 μm, have poor storage stability since the degree of sedimentation thereof after 24 hours was high and the hardness of the sediment layer was high. Also, the negative electrode slurry compositions of Comparative Examples 4 and 5 have the same clay particle diameter range as that of the negative electrode slurry compositions of Examples 1 to 3, 7, and 8, and also include carboxymethylcellulose (CMC), a negative electrode active material, and an aqueous solvent. However, when compared to those of Examples 1 to 3, 7, and 8, the degree of sedimentation thereof after 24 hours was high and the hardness of the sediment layer was high. From the results, it was confirmed that when the weight ratio of carboxymethylcellulose and clay particles satisfies 9.5:0.5 to 4:6, the degree of sedimentation after 24 hours was low and the hardness of the sediment layer was low, so that storage stability was excellent. However, when the weight ratio was out of the above range, the storage stability was sharply deteriorated. From the results, it was confirmed that the presence of clay particles and the average particle diameter ($D_{50}$) of the clay particles had a significant influence on the storage stability of a negative electrode slurry composition, and that the weight ratio of carboxymethylcellulose and clay particles also had a significant influence on the storage stability of a negative electrode slurry composition.

Experimental Example 2: Filter Test

Figure 3:
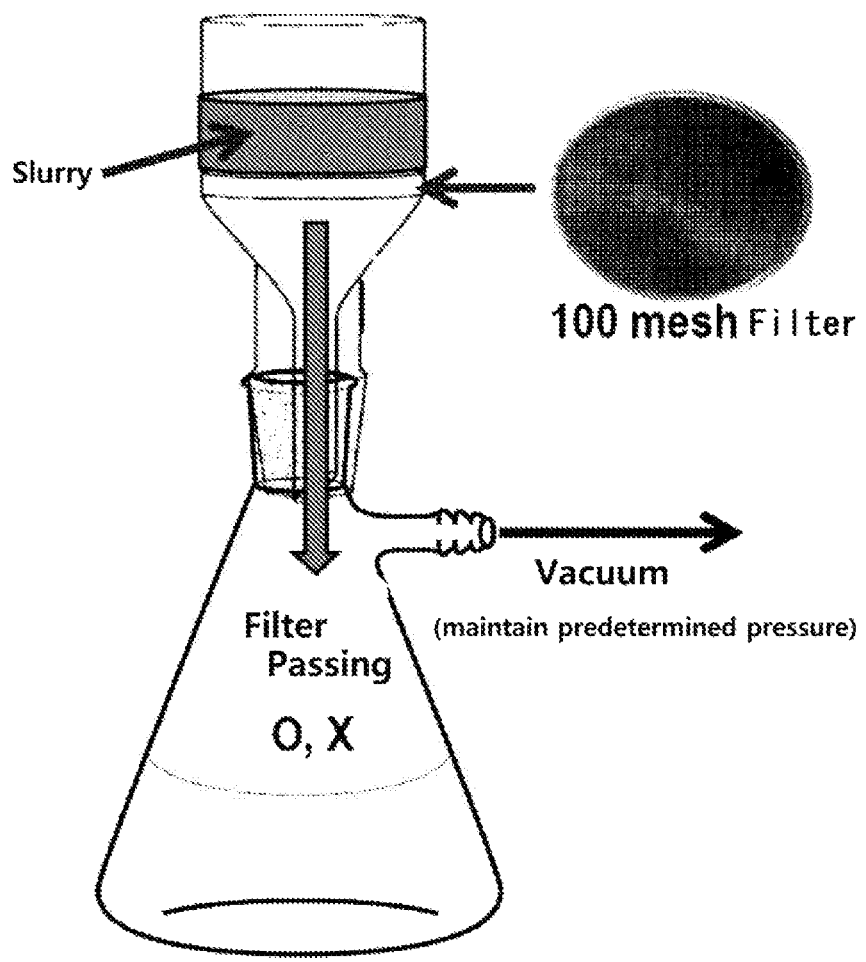
FIG. 3 is a view schematically showing a filter test method.

The negative electrode slurry compositions each prepared in Examples 1 to 8 and Comparative Examples 1 to 5 were subjected to a filter test by using a device designed to allow a slurry which has been placed above a 30 mesh filter to move downward through the filter by lowering the pressure below the filter, as is shown in FIG. 3. The test was repeated while replacing the filter with a 60 mesh filter, a 70 mesh filter, an 80 mesh filter, and a 100 mesh filter, respectively. The results are shown in Table 2 below. When the filter was clogged by the negative electrode slurry composition, it was marked with an "X," and when most of the slurry passed through the filter, it was marked with "O."

Experimental Example 3: Measurement of Viscosity and Phase Angle

Using Hakke Rheometer (Thermo Scientific Co.), the viscosity, elastic modulus (G') and viscous modulus (G") according to the shear rate of the negative electrode slurry compositions each prepared in Examples 1 to 8 and Comparative Examples 1 to 5 were measured.

A viscosity value of an interval representing shear thickening in the measured viscosity was changed into a log value to measure a slope value (linear fitting value), and the results are shown in Table 2.

Also, the phase angle was calculated using tan(phase angle)=G'/G, and the results are shown in Table 2.

Figure 4:
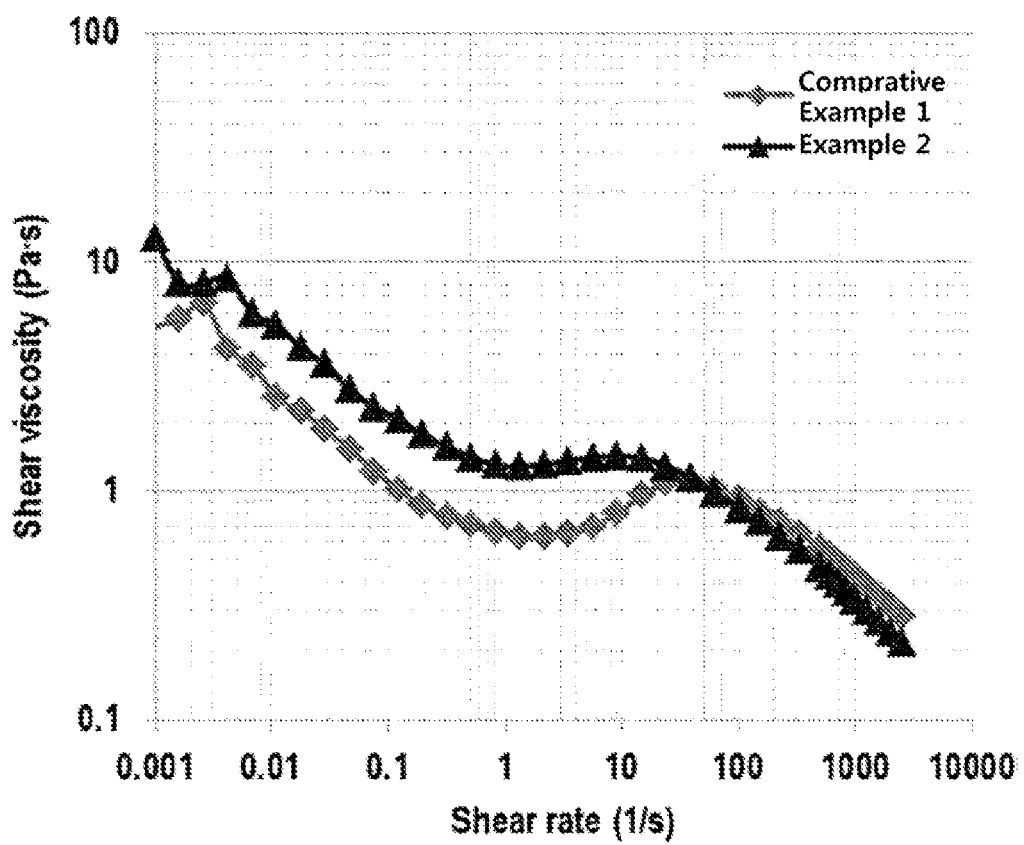
FIG. 4 is a view showing the results of measuring the viscosity according to the shear rate of the negative electrode slurry compositions each prepared in Example 2 and Comparative Example 1.
Figure 5:
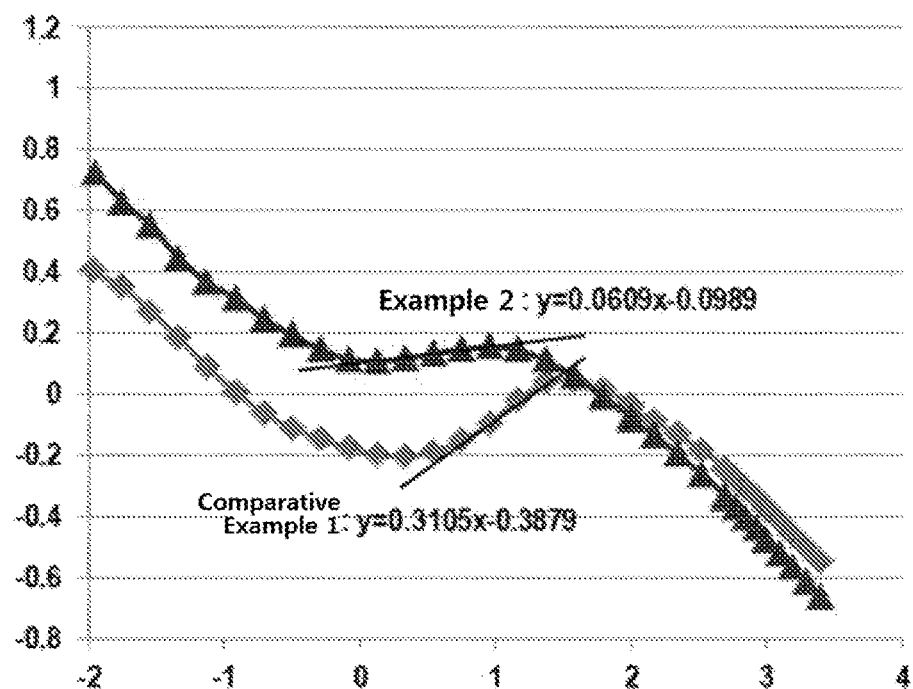
FIG. 5 is a view showing a viscosity value changed into a log value, the viscosity value of an interval representing shear thickening in the viscosity as measured in FIG. 4.

FIG. 4 is a view showing the results of measuring the viscosity according to the shear rate of the negative electrode slurry compositions each prepared in Example 2 and Comparative Example 1, and FIG. 5 is a view showing a viscosity value changed into a log value, the viscosity value of an interval representing shear thickening in the viscosity as measured in FIG. 4.

TABLE 2

| | Filter test (mesh No.) | | | | | Viscosity | Rheological properties | |
|---|---|---|---|---|---|---|---|---|
| | | | | | | | Phase angle | Shear thickening |
| | 100 | 80 | 70 | 60 | 30 | (1/s, Cp) | (°) | slope value |
| Example 1 | o | o | o | o | o | 2,100 | 65 | 0.17 |
| Example 2 | o | o | o | o | o | 1,300 | 57 | 0.06 |
| Example 3 | o | o | o | o | o | 3,300 | 48 | No shear thickening |
| Example 4 | o | o | o | o | o | 640 | 48 | 0.19 |
| Example 5 | o | o | o | o | o | 5,200 | 56 | No shear thickening |
| Example 6 | o | o | o | o | o | 4,300 | 54 | 0.08 |
| Example 7 | o | o | o | o | o | 3,100 | 62 | 0.21 |
| Example 8 | o | o | o | o | o | 3,500 | 48 | 0.05 |
| Comparative Example 1 | x | o | o | o | o | 650 | 68 | 0.31 |
| Comparative Example 2 | x | o | o | o | o | 1,300 | 62 | 0.13 |
| Comparative Example 3 | x | o | o | o | o | 1,100 | 48 | 0.12 |
| Comparative Example 4 | x | o | o | o | o | 1,100 | 52 | 0.26 |
| Comparative Example 5 | x | x | o | o | o | 6,500 | 44 | No shear thickening |

As can be seen in Table 2, in the case of the negative electrode slurry compositions each prepared in Examples 1 to 8, despite the high solid content thereof, no filter clogging occurred during the filter test. From the results, it was confirmed that the negative electrode active material was well dispersed in the negative electrode slurry composition. Meanwhile, in the case of the negative electrode slurry compositions each prepared in Comparative Examples 1 to 5, filter clogging occurred during the filter test. Since the $D_{90}$ of the artificial graphite used in Examples and Comparative Examples was 33±3 μm, when considering the mesh network spacing of a 100 mesh filter of approximately 0.15 mm, it can be determined that the reason for the filter clogging may be attributed to the fact that the artificial graphite was not well dispersed in the negative electrode slurry composition and solids were not evenly distributed and were agglomerated. From the results, it was confirmed that the presence of clay particles and the average particle diameter (D50) of the clay particles had a significant influence on the storage stability of a negative electrode slurry composition, and that the weight ratio of carboxymethylcellulose and clay particles also had a significant influence on the storage stability of a negative electrode slurry composition.

The invention claimed is:

1. A negative electrode slurry composition comprising:
   (1) clay particles having a plate-type structure and an average particle diameter ($D_{50}$) of 150 nm to 2 μm;
   (2) carboxymethylcellulose (CMC);
   (3) a negative electrode active material;
   (4) an aqueous solvent comprising water; and
   (5) a binder comprising a styrene butadiene rubber binder emulsion solution, wherein
   a weight ratio of the carboxymethylcellulose to the clay particles is 9.5:0.5 to 4:6,
   the negative electrode active material comprises a carbonaceous material,
   the clay particles comprise saponite, and
   the negative electrode slurry composition has a solid content of 45 wt % or greater.

2. The negative electrode slurry composition of claim 1, wherein at a surface of the clay particles, an edge portion of the plate-type structure represents a partially positive charge ($\delta^+$), and an inner surface portion of the edge portion of the plate-type structure represents a partially negative charge ($\delta^-$), and
   the partially positive charge of the edge portion of the plate-type structure interacts with a carboxy group of the carboxymethylcellulose through a polar interaction.

3. The negative electrode slurry composition of claim 1, wherein the clay particles contain a 2:1 type clay mineral having a ratio of a tetrahedral sheet to an octahedral sheet of 2:1.

4. The negative electrode slurry composition of claim 1, wherein the negative electrode slurry composition has a sedimentation height of 10 mm or less, when the sedimentation height is measured by filling the negative electrode slurry composition to a height of 135 mm in a glass cylinder having an inner diameter of 8 mm, and then 24 hours later, allowing the negative electrode slurry composition to sink downwards from the height of 135 mm.

5. The negative electrode slurry composition of claim 1, wherein the negative electrode slurry composition has an intensity of force acting at a height of 10 mm from a bottom of a glass cylinder of 1 N or less, when the intensity of force is measured by filling the negative electrode slurry composition to a height of 50 mm in the glass cylinder having an inner diameter of 25 mm, and then 24 hours later, moving a rectangular stick having a thickness of 5 mm in all directions from a top of the glass cylinder to the bottom of the glass cylinder at a speed of 1 mm/s.

6. The negative electrode slurry composition of claim 1, wherein the negative electrode slurry composition has a shear thickening slope value of 0.3 or less when measuring a shear viscosity.

7. The negative electrode slurry composition of claim 1, wherein the negative electrode slurry composition is capable of passing through a filter of 100 mesh or more.

8. The negative electrode slurry composition of claim 1, wherein the negative electrode slurry composition has a viscosity of 8,000 cp or less.

9. The negative electrode slurry composition of claim 1, wherein the negative electrode slurry composition has a phase angle of 25° or higher.

10. A method of preparing the negative electrode slurry composition of claim 1, the method comprising:
    (A) preparing a first mixture comprising the clay particles having the plate-type structure and the average particle diameter ($D_{50}$) of 150 nm to 2 μm, carboxymethylcellulose (CMC), and the aqueous solvent;
    (B) preparing a second mixture by adding the negative electrode active material to the first mixture; and
    (C) preparing the negative electrode slurry composition by adding a binder to the second mixture, wherein
    the weight ratio of the carboxymethylcellulose to the clay particles is 9.5:0.5 to 4:6, and
    the binder comprises the styrene butadiene rubber binder emulsion solution.

11. The method of claim 10, further comprising mixing a conductive agent with the first mixture after (A) of preparing the first mixture and before (B).

12. The method of claim 10, further comprising (B-1) introducing the clay particles having the plate-type structure and the average diameter ($D_{50}$) of 150 nm to 2 μm, carboxymethylcellulose (CMC), and the aqueous solvent to the second mixture between (B) and (C), wherein
    the weight ratio of the carboxymethylcellulose to the clay particles is 9:1 to 5:5.

13. The method of claim 12, wherein the negative electrode slurry composition has a solid content of 45 wt % or greater.

14. A negative electrode for a lithium secondary battery manufactured by using the negative electrode slurry composition according to claim 1.

15. The lithium secondary battery comprising the negative electrode of claim 14.

16. The negative electrode slurry composition of claim 1, wherein the negative electrode active material comprises at least artificial graphite, and the negative electrode active material has an average particle diameter (D50) of 10 μm to 30 μm.

17. The negative electrode slurry composition of claim 1, wherein the average particle diameter ($D_{50}$) of the clay particles ranges from 150 nm to 1.5 μm.

* * * * *